(12) United States Patent
Ayme et al.

(10) Patent No.: US 8,358,898 B2
(45) Date of Patent: Jan. 22, 2013

(54) STORAGE DEVICE FOR THE OVERLENGTH OF AN OPTICAL FIBER OR OTHER TYPE OF CABLE

(75) Inventors: Arnaud Camille Ayme, Toulouse (FR); Serge Thierry Roques, Cornebarrieu (FR)

(73) Assignee: Labinal, Blagnac (FR)

( * ) Notice: Subject to any disclaimer, the term of this patent is extended or adjusted under 35 U.S.C. 154(b) by 153 days.

(21) Appl. No.: 12/731,602

(22) Filed: Mar. 25, 2010

(65) Prior Publication Data

US 2010/0260464 A1 Oct. 14, 2010

(30) Foreign Application Priority Data

Mar. 25, 2009 (FR) ...................................... 09 51913

(51) Int. Cl.
*G02B 6/00* (2006.01)

(52) U.S. Cl. ....................... 385/135; 385/136

(58) Field of Classification Search .......... 385/134–136; 439/456, 501; 174/70 R
See application file for complete search history.

(56) References Cited

U.S. PATENT DOCUMENTS

| 5,314,342 | A | * | 5/1994 | Figge ............................... 439/66 |
| 5,890,265 | A | * | 4/1999 | Christian et al. ............ 24/16 PB |
| 5,894,540 | A | | 4/1999 | Drewing et al. |
| 6,215,937 | B1 | | 4/2001 | Dinh |
| 6,361,360 | B1 | * | 3/2002 | Hwang et al. .................. 439/501 |
| 2006/0024015 | A1 | | 2/2006 | Arima |

FOREIGN PATENT DOCUMENTS

| EP | 0 331 479 A1 | 9/1989 |
| FR | 2 678 076 | 12/1992 |
| WO | WO 2005/108268 A1 | 11/2005 |

* cited by examiner

*Primary Examiner* — Uyen Chau N Le
*Assistant Examiner* — Michael Mooney
(74) *Attorney, Agent, or Firm* — Oblon, Spivak, McClelland, Maier & Neustadt, L.L.P.

(57) ABSTRACT

A device for storing an excess length of a cable, the device includes two separate guide members configured to guide the cable, each guide member presenting a groove for receiving the cable, the relative position of the guide members being adjustable with a longitudinal part extending having a first end and a free second end, the first end being secured to one of the guide members, the longitudinal part being suitable for being fastened to the other guide member from the free second end and being capable of being moved relative to the other guide member while remaining fastened thereto.

12 Claims, 3 Drawing Sheets

STORAGE DEVICE FOR THE OVERLENGTH OF AN OPTICAL FIBER OR OTHER TYPE OF CABLE

BACKGROUND OF THE INVENTION

1. Field of the Invention

The present invention relates to a device for storing an excess length of at least one optical fiber or some other type of cable.

The invention relates to the technique of cabling using electrical cables or harnesses and optical fibers or some other type of cable in an environment, e.g. but not exclusively, in an airplane or in a similar apparatus.

2. Discussion of the Background

As is well known, optical fibers serve in particular to convey signals at a very high rate and in reliable manner. In particular, sensitivity to electromagnetic interference (EMI), i.e. sensitivity to an external electromagnetic field, is greatly reduced. Nevertheless, the strand of glass that constitutes the optical fiber is very fragile and runs the risk of breaking if it is subjected to stresses that are too high, in particular as a result of bending with too small a radius of curvature within the intended equipment.

When fitting an airplane with information transmission means, determining the exact length required for electrical and optical fiber cabling constitutes a major problem. If the cabling is provided with a length that is too short, then it cannot be put into place. In contrast, if the cabling is provided at a length that is too long, then the question arises of what to do with the excess length of cabling, and in particular of optical fiber.

Certain airplane designers cause optical fibers to follow helical paths over the periphery of an electrical harness so as to be able to compensate for the excess length of fiber by modifying the pitch of the helix. That installation technique presents certain drawbacks. If it is necessary to remove an electric cable from the harness, the optical fiber installed around the periphery of the harness runs the risk of impeding access to the cable and to its replacement. In addition, since the optical fibers are located on the outside of the harness, involuntary handling of the optical fiber runs the risk of damaging it.

SUMMARY OF THE INVENTION

An object of the present invention is to provide a device for storing an excess length of at least one optical fiber or some other type of cable (e.g. a coaxial cable or a bus cable), which device can easily be adapted to differing amounts of excess length of optical fibers and can easily be handled by the personnel responsible for fitting the optical fiber and/or electric cable.

To achieve this object of the invention, the device for storing an excess length of at least one optical fiber or some other type of cable comprises two separate guide members configured to guide a portion of at least one optical fiber or one cable, each guide member presenting a periphery that is substantially perpendicular to a plane in a travel direction, said periphery including in a fraction of its outline a groove that is suitable for receiving a portion of at least one optical fiber or one cable, said groove being defined by at least one curved portion having at least a radius of curvature that is greater than the minimum radius of curvature that is acceptable for the fiber or the cable, and the relative position of said guide members in said plane being adjustable with the help of at least one longitudinal part extending parallel to the travel direction and having a first end and a free second end, said first end being secured to one of the guide members, said longitudinal part being suitable for being fastened to the other guide member from the free second end of said part and being capable of being moved relative to said other guide member while remaining fastened thereto, whereby adjustment of the relative position of said guide members enables the surplus length of said fiber or said cable to be stored on said guide members.

Thus, the device of the invention comprises means for adjusting the relative position of the guide members in a plane in a travel direction, which means comprise at least one longitudinal part extending parallel to the travel direction and having a first end secured to one of the guide members, said longitudinal part comprising, from its second end and over at least a fraction of its length, first fastener elements suitable for co-operating with second fastener elements carried by the other guide member, whereby adjustment of the relative position of said guide members enables the excess length of said optical fiber or of said cable to be stored on said guide members.

It can be understood that the excess length is stored on the device of the invention in the form of a loop passing over the peripheries of the two guide members.

It can be understood that because of the presence of the adjustment means, personnel responsible for installation are enabled to adapt the device in very simple manner to the amount of the excess length that needs to be stored, merely by suitably spacing the guide members apart with the help of the means for adjusting their relative position.

It can also be understood that the first end of the longitudinal part is secured to one of the two guide members and that its second end is suitable for co-operating with second fastener elements carried by the other guide member, first fastener elements being provided from the second end of the longitudinal part and over at least a fraction of its length. As a result, the device of the invention presents a structure that is very simple and it is very easy to assemble.

Advantageously, the second end of said longitudinal part is suitable for being engaged in a through slot in said other guide member.

It can be understood that the through nature of the slot makes it possible, while the two guide members are being moved towards each other, for the second end of the longitudinal part to leave the slot after passing through it, such that the amplitude over which the relative position of the two guide members can be adjusted depends solely on the length of the fraction of the longitudinal part that has the first fastener elements provided thereon. As a result, even if the guide members are of small dimensions, the amplitude over which the relative position of the two guide members can be adjusted may be large, thereby enabling the size of the guide device to be optimized while retaining high performance.

Advantageously, said through slot leads to a ramp portion.

It can thus be understood that the second end of the longitudinal part is curved a little on coming into contact with the ramp portion, such that the end of the slot opposite from the opening through which the longitudinal part is inserted can open out into a portion of the outline of the periphery of the guide member when it is spaced apart from the guide groove. This avoids the second end of the longitudinal part impeding the guidance of the optical fiber or of the other type of cable.

It can also be understood that the ramp portion may serve as a deflector for enhancing co-operation between the first fastener elements and the second fastener elements.

Advantageously, said longitudinal part is fastened to said other guide member in said slot.

It can thus be understood that the second fastener elements are provided in said slot.

Preferably, said fraction of the outline of the periphery of each guide member and the path followed by said groove are substantially semi-circular.

Advantageously, the relative position of said guide members may only be adjusted in the direction of moving said guide members apart from each other.

It can thus be understood that the relative adjustment position means comprise solely means for spacing the guide members apart from each other.

Advantageously, said longitudinal part presents teeth and said other guide member presents at least one pawl shaped to be capable of co-operating with the gaps existing between said teeth.

It can thus be understood that the first fastener elements are teeth and the second fastener element is a pawl shaped to co-operate with the gaps that exist between said teeth.

Advantageously, said teeth are asymmetrical.

Preferably, said pawl is retractable.

Advantageously, the storage device includes two mutually parallel longitudinal parts that are parallel to the travel direction.

It can be understood that the relative position adjustment means comprise two mutually parallel longitudinal parts that are parallel to the travel direction.

Advantageously, the first end of one of the two longitudinal parts is secured to one of the guide members, and the first end of the other longitudinal part is secured to the other guide member.

It can be understood that the storage device of the invention can thus be obtained by assembling together two identical parts, each comprising one guide member and one longitudinal part having one end secured to said guide member. As a result, the guide device as obtained in this way is even simpler, even easier to assemble, and suitable for fabricating at reduced cost, since the two parts are identical.

BRIEF DESCRIPTION OF THE DRAWINGS

Other characteristics and advantages of the invention appear better on reading the following description of several embodiments of the invention given as non-limiting examples. The description refers to the accompanying Figures, in which.

DETAILED DESCRIPTION OF THE PREFERRED EMBODIMENTS

Figure 1A:
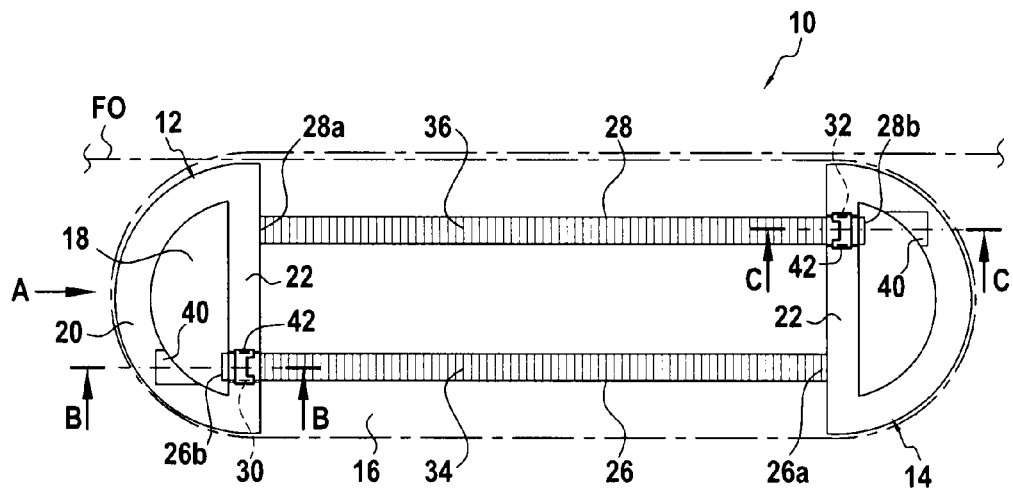
FIG. 1A is an overall view of a device for storing an excess length of fiber, showing the two guide members adjusted in a position of maximum relative spacing.

With reference initially to FIG. 1A, there follows a description of the general structure of the device for storing an excess length of fiber, referred to below as a storage device. The description below illustrates the present invention in its use with optical fibers, however it should be understood that it is also possible to envisage using the present invention with any other type of cable.

The storage device is essentially constituted by two fiber guide members 12 and 14 and by means for adjusting the relative position of the guide members, which means are given overall reference 16. The guide members are movable relative to each other in a plane.

Figure 2:
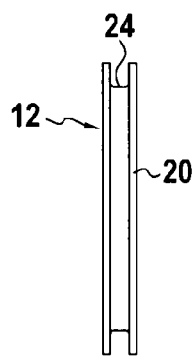
FIG. 2 is a view of a guide member seen looking along arrow A of FIG. 1A for storing a single fiber.

Preferably, each fiber guide member 12, 14 is generally semi-circular in shape and includes a central void 18, thereby defining a first portion 20 of semi-circular shape having its ends connected together by a rectilinear portion 22. The periphery of the portion 20 of semi-circular shape defines a groove 24 that can be seen better in FIG. 2. This groove 24 is naturally intended to receive the optical fiber.

In the embodiment shown in FIG. 1A, the means 16 for adjusting relative position are constituted by two elongate parts 26 and 28. A first end 26a, 28a of each of these parts is secured to the rectilinear portion 22 of a guide member 12 or 14, and the second end 26b, 28b thereof is engaged in a through slot 30, 32 formed in the rectilinear portion 22 of the guide member in such a manner that the end 26b, 28b is capable of moving relative to the corresponding guide member.

Figure 1B:
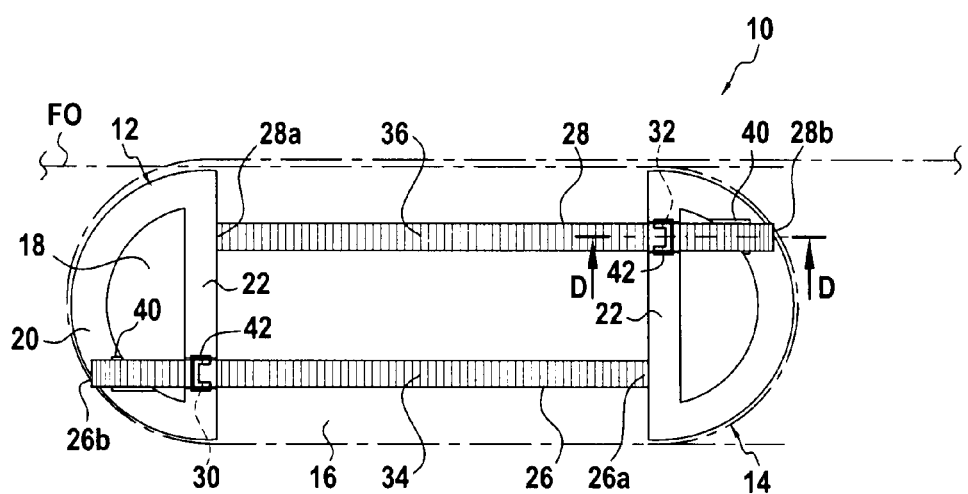
FIG. 1B is an overall view of the device for storing an excess length of fiber or of other types of cable, with the two guide members shown adjusted in a position of closer relative spacing.
Figure 4:
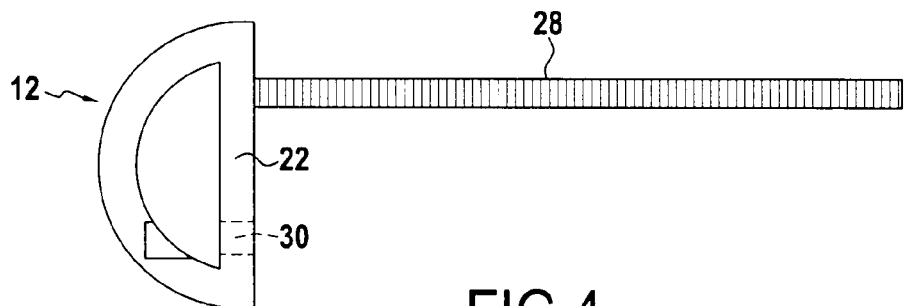
FIG. 4 shows one of the two component parts of the device for storing an excess length of fiber.

FIG. 4 shows one of the two parts constituting the storage device, this part being constituted for instance by the guide member 12 and the elongate part 28. Both parts are identical and they are installed opposite ways round on being assembled together, so that the second end 26b of the elongate part 26 is engaged in the slot 30 of the guide member 12 and so that the second end 28b of the elongate part 28 is engaged in the slot 32 of the other guide member 14, as shown in FIGS. 1A and 1B.

Each elongate part 26, 28 of the means 16 for adjusting relative position has one of its faces 34, 36 that is provided with asymmetrical teeth suitable for co-operating with a respective pawl disposed in each of the slots 30 and 32. The asymmetrical teeth 34, 36 and the pawls arranged in the slots 30 and 32 are advantageously made in such a manner as to enable the guide members 12 and 14 to be moved apart from each other but not towards each other. These members preferably co-operate in a unidirectional manner.

Figure 1C:
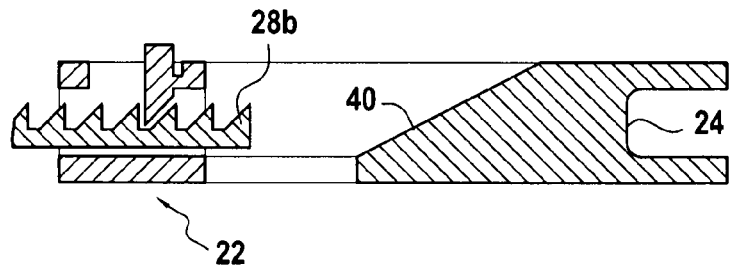
FIG. 1C is a section view on line C-C of FIG. 1A.
Figure 1D:
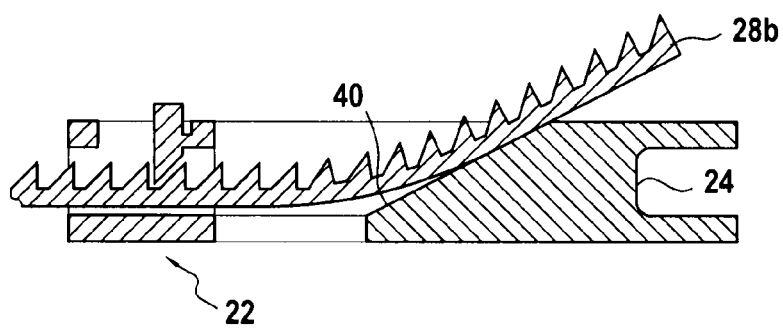
FIG. 1D is a section view on line D-D of FIG. 1B.

As shown in FIGS. 1C and 1D, the portion 20 of semi-circular shape in each of the guide members has a ramp portion 40 in line with the slot 30 or 32, thereby making it easier to extract the free ends 26b, 28b of the elongate parts 26 and 28 from the slots 30 and 32, and facilitating engagement of the asymmetrical teeth with the pawl, and also enabling the free ends 26b and 28b of the elongate parts 26 and 28 to leave the slot 30 or 32 while being spaced apart from the groove 24.

The elongate parts 26 and 28 need to present sufficient stiffness to maintain the spacing between the guide members 12 and 14, but also a certain amount of flexibility so as to enable them to be curved where they pass over the ramp portion 40, thus enabling them to pass over the semi-circular portions of the guide members.

Figure 5:
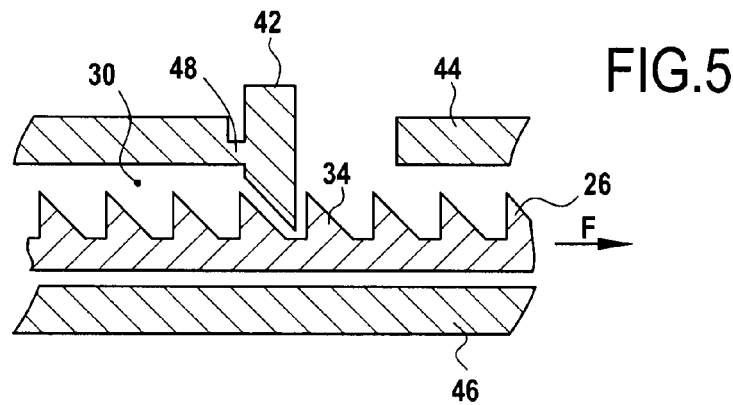
FIG. 5 is a fragmentary section view on line B-B of FIG. 1A showing a retractable pawl.

FIG. 5 shows a pawl 42 formed in the slot 30, which pawl is retractable. In this figure, there can be seen the two walls 44 and 46 of the rectilinear portion 22 that define the slot 30, and also a portion of the elongate part 26 with its asymmetrical teeth 34. The retractable pawl 42 is connected to the wall portion 44 by a zone 48 of reduced thickness, which thus defines an axis enabling the pawl 42 to pivot relative to the wall 44. It can be seen that by exerting traction in the direction of arrow F on the elongate part 26, it is possible to cause the retractable pawl 42 to pivot about the axis defined by the zone 48, thereby separating the elongate part 26 from the guide member 12.

Figure 6:
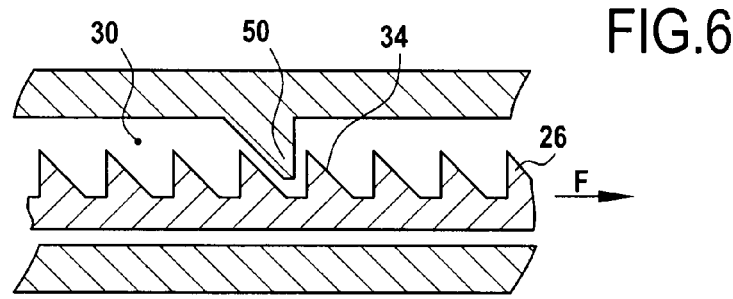
FIG. 6 is a view analogous to FIG. 5, showing a stationary pawl.

FIG. 6 shows a variant in which a non-retractable pawl 50 is formed in the slot 30.

Figure 3:
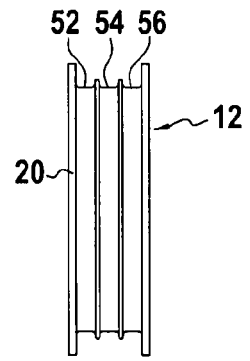
FIG. 3 is a view analogous to the view of FIG. 2 showing the possibility of storing a plurality of fibers.

FIG. 3 shows a variant of the storage device that is suitable for storing a plurality of optical fibers. In the particular example of FIG. 3, the storage device serves to store the excess length of three optical fibers. For this purpose, the peripheries of the guide members are provided with three grooves 52, 54, and 56. Nevertheless, without going beyond the ambit of the present invention, provision could be made for a storage device that is suitable for storing some other number of optical fibers.

Figure 7:
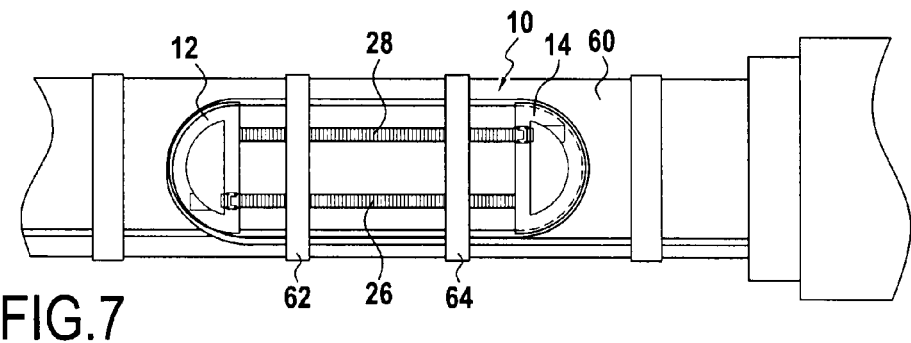
FIG. 7 is a plan view showing one way of fastening the device for storing an excess length of optical fiber on an electric cable harness.

Implementation of the device for storing an excess length of optical fiber can readily be understood from the above description. Initially, the guide members 12 and 14 occupy a close-together position and the optical fiber is engaged in the grooves of the guide members 12 and 14. The optical fiber is referenced FO in FIGS. 1A and 1B. After the optical fiber has been engaged in the grooves, the user moves the two guide members 12 and 14 apart manually and progressively until the fiber, or more precisely the excess length of fiber, presents an appropriate level of tension. The user then stops exerting the traction for spacing the guide members apart, and this position is then held by the asymmetrical nature of the teeth 34 of the elongate parts 26 and 28 and by the shape of the pawls. Once the excess length of optical fiber has been stored on the excess length storage device 10, the device may be fastened to an electric cable harness 60, as shown more clearly in FIG. 7. The device may be fastened to the harness 60 by any means, e.g. using collars 62 and 64.

It can be understood that the version with a retractable pawl 42 makes it possible, when it is desired to separate the optical fiber from the harness, to release the two guide members 12 and 14 so that they can move towards each other, thereby enabling the optical fiber to be removed from the storage device.

Naturally, numerous variants of the storage device may be used. In particular, the guide members may be of any other shape, providing the peripheries of the guide members, and thus the grooves that are formed therein, are such that the or each radius of curvature in the periphery is greater than the minimum radius of curvature that can be accepted by the optical fiber that is to be stored thereon, and providing the portion of optical fiber that "exits" the guide member, i.e. the portion of optical fiber that is not placed on the guide members, is substantially tangential to the end of the periphery of the corresponding guide member.

Figure 8:
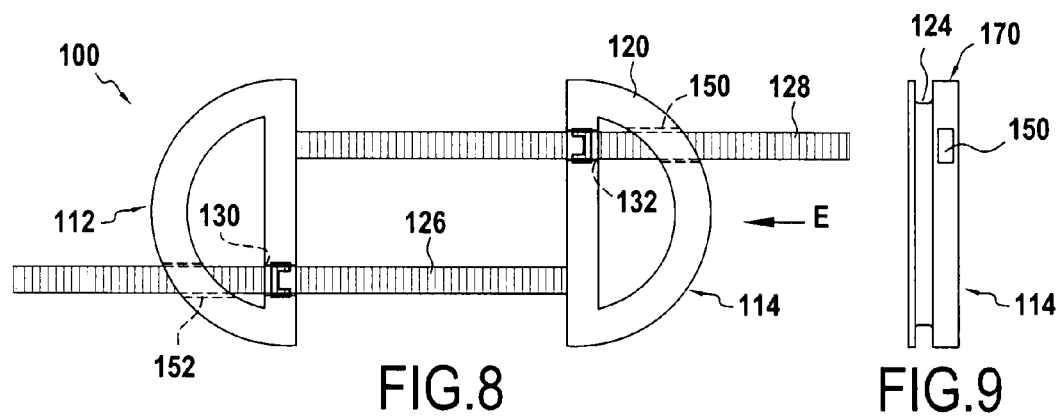
FIG. 8 is an overall view of another embodiment of the device for storing an excess length of fiber.
Figure 9:
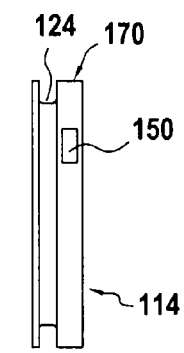
FIG. 9 is a view of a guide member seen looking along arrow E of FIG. 8.

FIGS. 8 and 9 show a storage device 100 in another embodiment, in which the ramp portion of each guide member is replaced by a through hole 150, 152, formed in the semi-circular portion 120 of the corresponding guide member 112, 114.

The through hole 150, 152 presents a first end that is provided facing the end of the through slot 130, 132 opposite from the opening through which the elongate part 126, 128 is inserted.

The through hole 150, 152 presents a second end that is provided in a portion 170 of the periphery of the guide member 112, 114 in the vicinity of the groove 124, but spaced apart therefrom.

Thus, the elongate part 126, 128 is configured to be inserted into the through slot 130, 132, and to exit through the opposite end thereof, to penetrate into the through hole 150, 152 via the first end thereof, and then to exit the guide member 112, 114 via the second end of the through hole 150, 152, at a position that is spaced apart from the groove 124.

Consequently, the elongate parts 126, 128 of the storage device are not curved where they leave the corresponding guide member 112, 114, so the elongate parts may present a high level of stiffness.

Without going beyond the ambit of the present invention, it is also possible to provide a storage device in which the guide members do not present central voids. The portion of the ramp or the through hole, depending on the embodiment of the storage device, could then be provided directly in line with the slot into which the elongate part is engaged, and thus be integral with the slot.

The invention claimed is:

1. A device for storing an excess length of at least one optical fiber or some other type of cable, the device comprising two separate guide members configured to guide a portion of at least one optical fiber or one cable, each guide member presenting a periphery that is substantially perpendicular to a plane in a travel direction, said periphery including in a fraction of its outline a groove that is suitable for receiving a portion of at least one optical fiber or one cable, said groove being defined by at least one curved portion having at least a radius of curvature that is greater than the minimum radius of curvature that is acceptable for the fiber or the cable, and the relative position of said guide members in said plane being adjustable with the help of at least one longitudinal part extending parallel to the travel direction and having a first end and a free second end, said first end being permanently secured to one of the guide members, said longitudinal part being suitable for being fastened to the other guide member from the free second end of said part and being capable of being moved relative to said other guide member while remaining fastened thereto, whereby adjustment of the relative position of said guide members enables the surplus length of said fiber or said cable to be stored on said guide members.

2. A storage device according to claim 1, wherein the second end of said longitudinal part is suitable for being engaged in a through slot in said other guide member.

3. A storage device according to claim 2, wherein said through slot leads to a ramp portion.

4. A storage device according to claim 2, wherein said longitudinal part is fastened to said other guide member in said slot.

5. A storage device according to claim 1, wherein said fraction of the outline of the periphery of each guide member and the path followed by said groove are substantially semi-circular.

6. A storage device according to claim 1, wherein the relative position of said guide members may only be adjusted in the direction of moving said guide members apart from each other.

7. A storage device according to claim 1, wherein said longitudinal part presents teeth and said other guide member presents at least one pawl shaped to be capable of co-operating with the gaps existing between said teeth.

8. A storage device according to claim 7, wherein said teeth are asymmetrical.

9. A storage device according to claim 7, wherein said pawl is retractable.

10. A storage device according to claim 1, including two mutually parallel longitudinal parts that are parallel to the travel direction.

11. A storage device according to claim 10, wherein the first end of one of the two longitudinal parts is secured to one of the guide members, and wherein the first end of the other longitudinal part is secured to the other guide member.

12. A device for storing an excess length of at least one optical fiber or some other type of cable, the device comprising two separate guide members configured to guide a portion of at least one optical fiber or one cable, each guide member presenting a periphery that is substantially perpendicular to a plane in a travel direction, said periphery including in a fraction of its outline a groove that is suitable for receiving a portion of at least one optical fiber or one cable, said groove being defined by at least one curved portion having at least a radius of curvature that is greater than the minimum radius of curvature that is acceptable for the fiber or the cable, and the relative position of said guide members in said plane being adjustable with the help of at least one longitudinal part extending parallel to the travel direction and having a first end and a free second end, said first end being secured to one of the guide members, said longitudinal part being suitable for being fastened to the other guide member from the free second end of said part and being capable of being moved relative to said other guide member while remaining fastened thereto, whereby adjustment of the relative position of said guide members enables the surplus length of said fiber or said cable to be stored on said guide members, said at least one longitudinal part and said one of the guide members are formed in one single piece.

* * * * *